United States Patent [19]

Caton

[11] 3,936,144
[45] Feb. 3, 1976

[54] FREQUENCY SELECTIVE OPTICAL COUPLER

[75] Inventor: William M. Caton, San Diego, Calif.

[73] Assignee: The United States of America as represented by the Secretary of the Navy, Washington, D.C.

[22] Filed: Dec. 12, 1974

[21] Appl. No.: 532,261

[52] U.S. Cl. .......................... 350/96 C; 350/96 WG
[51] Int. Cl.² ............................................ G02B 5/14
[58] Field of Search ...................... 350/96 WG, 96 C

[56] References Cited
UNITED STATES PATENTS

| | | | |
|---|---|---|---|
| 3,208,342 | 9/1965 | Nethercot, Jr. | 350/96 WG |
| 3,408,131 | 10/1968 | Kapany | 350/96 WG |
| 3,558,213 | 1/1971 | Marcatili | 350/96 WG |
| 3,850,503 | 11/1974 | Riseberg et al. | 350/96 WG |

OTHER PUBLICATIONS

W. E. Martin et al., "Optical Waveguides by diffusion in II–VI compounds," Applied Physics Letters, Vol. 21, No. 7, Oct. 1972, pp. 325–327.

Primary Examiner—John K. Corbin
Assistant Examiner—Matthew W. Koren
Attorney, Agent, or Firm—R. S. Sciascia; G. J. Rubens; J. W. McLaren

[57] ABSTRACT

Coextensive first and second optical waveguides are disposed with substantially uniform periodic variations in spatial separation including repetitive sections of close proximity which will permit optical coupling therebetween. The first optical waveguide has a different optical length (i.e., different light energy propagation characteristics) than the second optical waveguide. Due to the different effective optical lengths of the two waveguides between contiguous sections of close proximity where optical coupling may take place, light energy of a determinable frequency propagated along one of the waveguides is substantially all coupled into the other optical waveguide in the course of propagating along a determinable number of the repetitive sections; light energy of all other frequencies is effectively phase cancelled and thus inhibited from being coupled between the two optical waveguides.

4 Claims, 4 Drawing Figures

FREQUENCY SELECTIVE OPTICAL COUPLER

BACKGROUND OF THE INVENTION

The development and adaption of optical techniques for application to communications, data processing, and similar signal transmission systems has numerous advantages as compared with electronic systems directed to comparable objectives.

Low loss, high quality, multi-mode fiber optic cable has recently been developed which renders optical communication, data processing and signal transmission systems feasible, practical, and desirable. Some of the more important advantages of fiber optic cables used in such systems include greatly reduced size, weight, and cost; electrical isolation which eliminates grounding and ground loops; reduced constraints related to impedance matching requirements; and ease of coupling to common logic circuitry by use of available light sources and detectors. Moreover, fiber optic cables when used in such systems permit high channel-to-channel isolation, easy interchangeability with electrical cable, and greatly reduced electromagnetic interference.

One of the principal advantages of fiber optic cables for use in military systems is their virtual immunity to radio frequency signals and their characteristic of being capable of containing transmitted signals wholly within the cables. In ground communications systems this attribute greatly increases transmission security. The use of optical cables also eliminates cross-talk and the optical paths provided by such fiber optic cables are resistant to electromagnetic interference from other equipment such as may be present in an aircraft, vessel, or vehicle.

In such optical systems there is a need for frequency selective optical couplers which when connected to fiber optic cables, for example, are capable of selectively extracting signal information from an optical path while rejecting or inhibiting the coupling of all other frequencies.

SUMMARY OF THE INVENTION

The present invention comprises a frequency selective optical coupler which has coextensive first and second optical waveguides disposed with substantially uniform periodic variations in spatial separation so that the waveguides are alternately widely separated and relatively closely spaced. The repetitive sections of close proximity of the first and second optical waveguides permit optical coupling therebetween.

However, inherent in the concept of the present invention is the requirement that one of the optical waveguides have a different effective optical length, i.e., different light energy propagation characteristics, relative to the second optical waveguide so that contiguous sections of close proximity of the two waveguides will effectively represent different optical lengths to the same frequency of light energy propagating along one of the optical waveguides.

Accordingly, when light energy of a determinable frequency is propagated along one of the optical waveguides, it is substantially all coupled into the other optical waveguide over a determinable number of such repetitive sections, while light energy of all other frequencies is effectively phase cancelled and inhibited from being coupled into the other optical waveguide.

The effective optical length or propagation characteristics of waveguides may be altered in a predetermined manner by variations in dimensions or by fabrication of different materials. Moreover, an extension of such advanced optical waveguide fabrication techniques is the predetermination of the propagation characteristics of optical waveguides by varying the amount and depth of diffusant which is diffused into a substrate to define an optical waveguide.

Accordingly, it is a primary object of the present invention to provide an improved frequency selective optical coupler.

Another most important object of the present invention is to provide such a frequency selective optical coupler which is capable of being fabricated in accordance with advance state-of-the-art optical microminiaturization techniques.

A further object of the present invention is to provide such a frequency selective optical coupler which is readily adaptable to fabrication through the use of a broad variety of different materials.

Yet another object of the present invention is to provide such a frequency selective optical coupler which is well suited to use in color multiplex optical integrated circuits.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
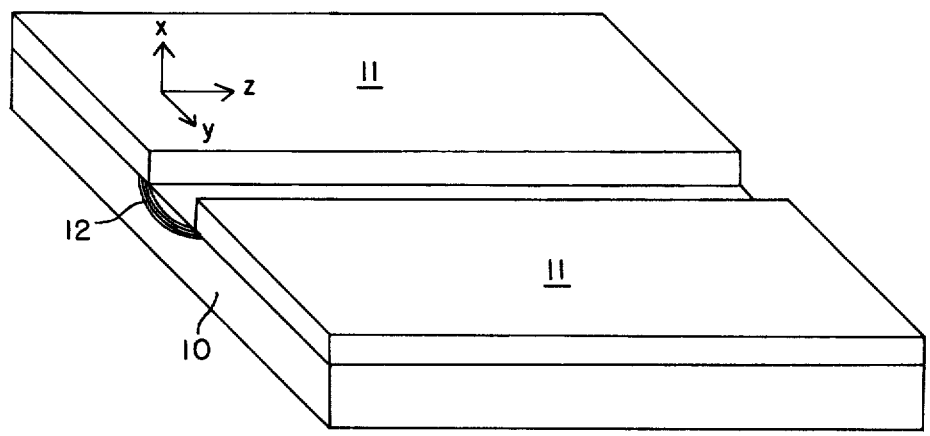
FIG. 1 is an illustration of one type of optical waveguide structure which may be employed in fabrication of the present invention.

The concept of electromagnetic energy propagating along a guiding structure is applicable to a very broad range of phenomena. Voice communication such as telephone conversations transferred from one point to another through the use of long lines, for example, or electrical power transmitted from one location to another are but two of many examples. Another example is microwave guides and even more recently optical dielectric waveguides have been developed and their behavior is susceptible to description with the help of the general concept which is applicable to the propagation of electromagnetic energy.

Energy of frequency f propagating along a guiding structure in a positive direction $x$ may be described by an amplitude $A(x)$ at each point $x$ along the guiding structure. The amplitude A may be determined from the solution of the differential equation $$\frac{d^2A(x)}{dx^2} + \beta2\ A(x) = 0;$$

One solution to equation (1) is the expression $$A(x) = A(o)e^{-j\beta x};  \quad (2)$$

The origin, $x = 0$, is arbitrary and in general $\beta$, the propagation constant, is a function of both $x$ and $f$. A non-sinusoidal signal of arbitrary characteristic can be represented as integral over all possible frequencies.

The concept of coupling between guiding structures is founded upon the phenomena that coupling occurs when electromagnetic energy is propagated down one waveguide only and some of such electromagnetic energy is transferred to a second waveguide. One example of this phenomenon is two telephone lines, for example, which are separated by a fraction of an inch and enclosed in the same long range cable. Under these conditions, a telephone conversation transmitted down one of the lines may be heard on the second line. In such an instance the phenomena creates an undesired condition in that the cross-talk is not generally desired from a system point of view.

Another example of coupling between transmission lines is two metal rectangular cross-section microwave wave guides having a common wall. If small holes are punched or drilled through the common wall, there will be an amount of coupling between the waveguides. Without such holes in the common wall, virtually no coupling will take place but the holes permit some energy to leak from one waveguide to the other thereby creating or producing a coupling between the two.

The energy propagating along two coupled guiding structures may be represented by the amplitudes $A_1(x)$ and $A_2(x)$ where x is a common measure of distance along the two coextensive guiding structures. The differential equations expressing these two amplitudes are $$\frac{d^2A_1(x)}{dx^2} + \beta_1{}^2 A_1(x) = K A_2(x) \quad (3)$$

$$\frac{d^2A_2(x)}{dx^2} + \beta_2{}^2 A_2(x) = K A_2(x) \quad (4)$$

where $k$ is in general a function of both x and f. Closed form solutions for these equations may only be found for special cases which are not of interest within the concept of the present invention, while the general solutions can be found by numerical techniques.

It has been shown and applied in the case of the microwave waveguide phenomena that if $\beta_1$, $\beta_2$, and k can be controlled as a function of $x$ and $f$, then band pass, band stop and low pass filters may be constructed from coupled guiding structures. The problem of constructing such filters and couplers in practice becomes one of devising a structure such that $\beta_1$, $\beta_2$, and $k$ can be controlled spatially to the extent necessary to achieve the desired result. For any particular given embodiment the numerical values $\beta_1$, $\beta_2$, and $k$ may in principle be calculated as a function of some chosen geometrical or physical parameter. In practice for the actual utilization of such a phenomena it may be necessary to build structures of spatially selected geometry and then measure $\beta_1$, $\beta_2$ and $k$ as a function of a chosen parameter.

One example of a guiding structure as a single mode dielectric optical waveguide is that illustrated in FIG. 1. In the structure illustrated in FIG. 1 Cd is diffused into a ZnSe wafer 10 through the opening in a SiO mask material 11 to create the region 12 of mixed crystal $Cd_xZn_{1-x}Se$ which is of higher refractive index than the substrate material 10. Accordingly, optical energy is principally confined within the optical waveguide region 12 and such optical energy decays exponentially away from the region 12 into the substrate material 10.

Figure 2:
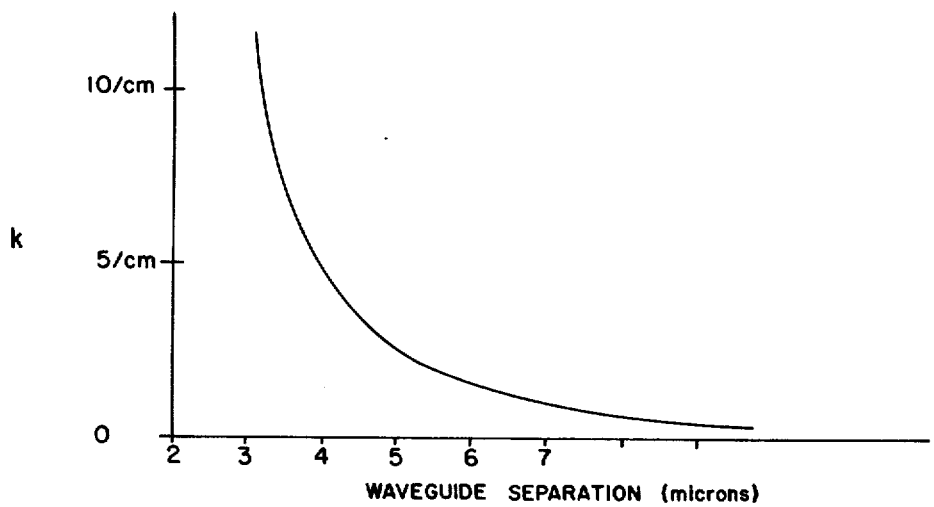
FIG. 2 is an illustration of coupling coefficient vs. optical waveguide separation.

When two such optical waveguides are fabricated co-linearly and co-extensively in the same substrate material in close proximity there is coupling developed between them which has a determinable coefficient. The coupling coefficient $k$ may be determined as a function of optical waveguide separation through the use of computer data processing and calculating techniques. Typical results of such calculations are illustrated in FIG. 2 which graphically depicts the magnitude of coupling coefficient $k$ vs optical waveguide separation measured from optical wave-guide center to optical waveguide center.

Figure 3:
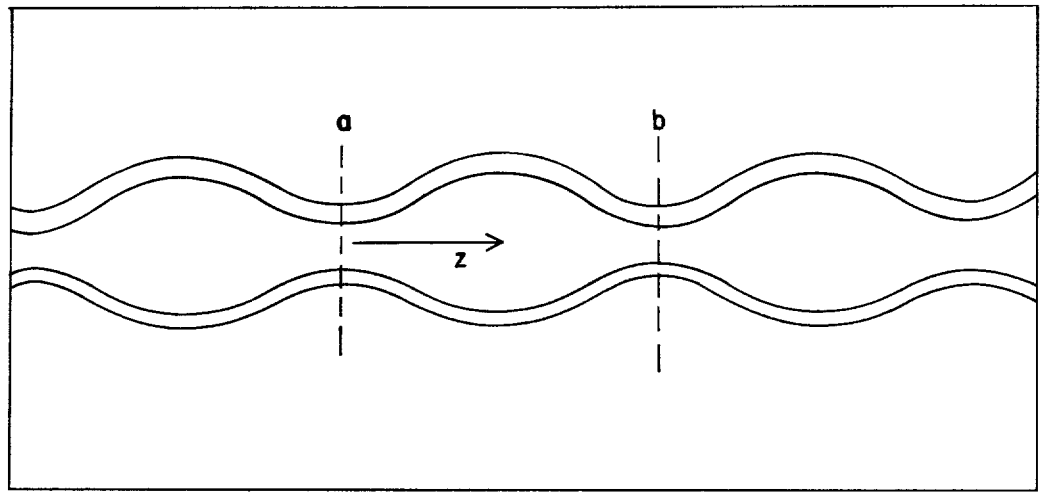
FIG. 3 is a greatly enlarged illustration of one configuration of a frequency selective optical coupler embodying the concept of the present invention.

A practical embodiment of the frequency selective optical coupler of the present invention is illustrated in FIG. 3. In the embodiment illustrated in FIG. 3 the quantities $\beta_1$ and $\beta_2$ are to a first approximation independent of $z$. The coupling coefficient k is however, a strong function of $z$. The operation of this device may be understood by assuming that a first approximation $k$ of 0 for all values of z except in the localized intervals where the coupling is enhanced by the techniques previously described. The two co-linear optical waveguides are dissimilar such that they represent different optical lengths or, stated in other words, they have dissimilar propagation velocities for the same frequency of light energy through the same physical length of waveguide. There are a number of different ways in which such dissimilarity may be achieved and controlled. One such technique is to fabricate the width of one optical waveguide to be greater than the width of the other optical waveguide. Alternative techniques are to diffuse different materials in the two waveguides or to diffuse the same material to different depths of diffusion and penetration.

Figure 4:
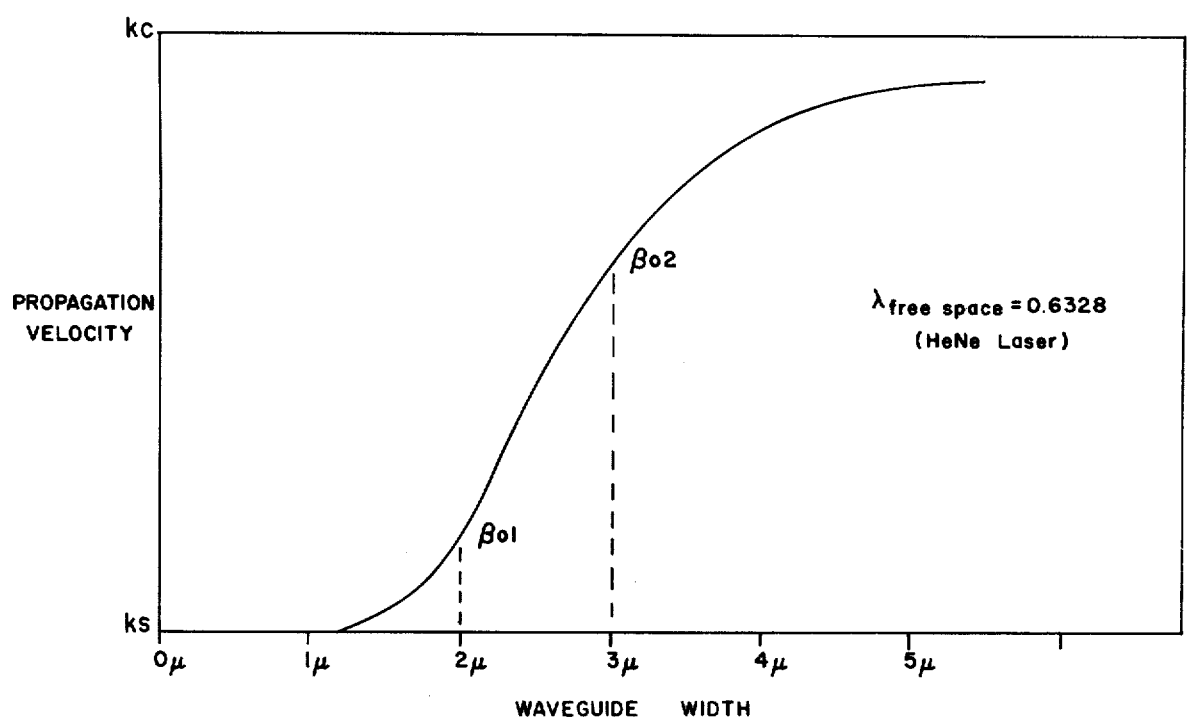
FIG. 4 is a graphical illustration of propagation velocity vs. optical waveguide width for HeNe laser light energy.

FIG. 4 illustrates propagation velocity vs. optical waveguide width for a HeNe laser of wavelength $\lambda_0$. The propagation velocity varies between free space velocity of the substrate $$Ks = \frac{2\pi}{\lambda_o} 2.58 \text{ rad/micron;} \quad (5)$$

for a ZnSe substrate, and $K_c$ the free space velocity of the core material. $k_c$ is variable by adjusting the concentration of Cd diffused into the substrate. A practical value for $k_c$ would be 1.1 $k_s$. The propagation velocities $\beta_{02}$ and $\beta_{01}$ for a two micron wide optical waveguide and a three micron wide optical waveguide are illustrated in the drawing of FIG. 4.

On the graph it may be seen that $\beta_2 = 1.05\ \beta_1$ and that $\beta_1 = 1.02 k_s$.

If the optical energy propagating along the two optical waveguides of FIG. 3 is in phase at the point $x = a$, then it will again come into phase at the point, $$\beta = a + \frac{2\pi}{\beta o_2 - \beta o_1} = a + 5 \text{ microns} \quad (6)$$

If point $b$ is positioned 5 microns from point $a$, the energy coupled into the second optical waveguide from the first optical waveguide will add in phase at point $b$. At a wavelength having the frequency of $\lambda_1$ differing from $\lambda_0$ the propagation velocities $b_{11}$ and $b_{21}$ have different values than for wavelength of frequency $\lambda_0$. The configuration of FIG. 3 scales to the new wavelength simply by scaling the horizontal axis in proportion to the wavelength. If, for example, $\lambda_1$ is $0.99 \lambda_0$, then $b_{11}$ and $b_{21}$ correspond to optical waveguides of width $1.01 W_1$ and $1.01 W_2$. Since the equivalent change in width is small, the propagation constants may be expanded in a McLaren series about $\beta_{01}$ and $\beta_{02}$ retaining only the linear term $$\beta_{11} = \beta_{10} + \alpha_1 \left( \frac{\lambda_0 - \lambda_1}{\lambda_0} \right) \approx \beta_{10} + 0.67 \, 0.05 \beta_{10} \quad (7)$$

$$\beta_{21} = \beta_{20} + {}_2 \left( \frac{\lambda_0 - \lambda_1}{\lambda_0} \right) \approx \beta_{20} + 0.25 \times 0.05 \beta_{20} \quad (8)$$

$$\beta_{11} + \beta_{10} \left( 1.00 + 0.67 \times \frac{\lambda_0 - \lambda_1}{\lambda_0} \right) \quad (9)$$

$$\beta_{21} = \beta_{10} \left( 1.00 + 0.25 \frac{\lambda_0 - \lambda_1}{\lambda_0} \right) 1.005 \quad (10)$$

If light energy which is 1% shorter in wavelength than $\lambda_0$ is propagating in both optical waveguides and is in phase at the point $a$, then the phase difference at point $b$ will be $$(\beta_{21} - \beta_{11}) L = 0.026 \text{ rad} \quad (11)$$

where L is the lineal distance between point a and point b as shown in FIG. 3.

That is to say, $\lambda_1$ will not add exactly in phase and if $2\pi/0.026 = 240$ of the unit intervals of the optical coupler are fabricated in series for a total length of the embodiment of $240 \times 5$ microns $= 1.2$ mm, then the wavelength $\lambda_1$ will be added at all angles up to $2\pi$ and total cancellation will occur between the two with the result that there will be virtually no total energy transfer in a 1.2 mm long structure.

Although these calculations involve some assumptions and approximations they demonstrate that an embodiment of the present inventive concept may be fabricated in only 1.2 mm length of an optical waveguide fabricated in the manner described in ZnSe. The separation between the optical waveguides is selected on the basis of data given by FIG. 2. In the regions of enhanced coupling a value of k is required such that after 240 such regions have been traversed in length, virtually 100% coupling will be achieved for the desired frequency of optical energy.

Accordingly, it may be seen from the description of a preferred embodiment of the present invention that a frequency selective optical coupler may be fabricated of first and second coextensive optical waveguides disposed with substantially uniform periodic variations in spatial separation, such spatial separation including repetitive sections of close proximity to permit optical coupling therebetween.

Additionally, the first optical waveguide is required to have a different effective optical length than the second optical wavelength between contiguous sections of close proximity which are included within the described substantial uniform periodic variations in spatial separation. That is to say that, the effective different optical length is the equivalent of different propagation velocities characteristic of the two optical waveguides so that they exhibit different propagation velocities for the same frequency of light energy. The result is that light energy of a determinable frequency propagated along one of the optical waveguides is substantially all coupled into the other optical waveguide over a determinable number of such repetitive sections and light energy of all other frequencies is virtually entirely inhibited from being coupled from the optical waveguide in which it is initially propagated into the other optical waveguide over the same determinable number of repetitive sections of the two optical waveguides.

It will be readily apparent to those knowledgeable and skilled in the pertinent arts that the concept of the present invention is adaptable to embodiment in many variations involving choices of materials and fabrication techniques. For example, numerous different material combinations are possible including Cd deposited or diffused into substrates ZnSe, ZnS, ZTe, or Cu into LiTaO$_3$, or Se into CdS.

The method of fabrication may include diffusion techniques, the employment of dopants, channel wave guides, or selective etching as is desired and convenient to the particular application desired for the practice of the present invention.

Obviously many modifications and variations of the present invention are possible in the light of the above teachings. It is therefore to be understood that within the scope of the appended claims the invention may be practiced otherwise than as specifically described.

What is claimed is:

1. A frequency selective optical coupler comprising: first and second optical waveguides disposed with substantially uniform periodic variations in spatial separation relative to a common directional axis between respective input and output terminals, including repetitive sections of close proximity to permit optical coupling between said optical waveguides;

said first optical waveguide having a different optical length than said second optical waveguide between contiguous sections of close proximity included within said substantially uniform periodic variations in spatial separation, whereby light energy of a determinable frequency propagated along said first optical waveguide is substantially all coupled into said second optical waveguide over a determinable number of said repetitive sections between said input and output terminals, and light energy of all other frequencies is inhibited from being coupled into said second optical waveguide over said determinable number of said repetitive sections between said input and output terminals.

2. A frequency selective optical coupler as claimed in claim 1 wherein said first and second optical waveguides are of identical dimensions but of different materials supported on a common substrate between said input and output terminals.

3. A frequency selective optical coupler as claimed in claim 1 wherein said first and second optical waveguides are of different dimensions and comprise the same material supported on a common substrate between said input and output terminals.

4. A frequency selective optical coupler as claimed in claim 1 wherein said first and second optical waveguides are of the same material diffused into a common substrate in different depths of penetration between said input and output terminals.

* * * * *